(12) United States Patent
Leidel (10) Patent No.: US 12,503,320 B2
(45) Date of Patent: Dec. 23, 2025

(54) CLAMP DEVICE AND METHOD FOR TRANSPORTING A CONTAINER

(71) Applicant: KRONES AG, Neutraubling (DE)

(72) Inventor: Marco Leidel, Rain (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/703,549

(22) Filed: Mar. 24, 2022

(65) Prior Publication Data

US 2022/0306401 A1 Sep. 29, 2022

(30) Foreign Application Priority Data

Mar. 24, 2021 (DE) .......................... 102021107294.8

(51) Int. Cl.
*B65G 47/86* (2006.01)
*B65G 47/90* (2006.01)

(52) U.S. Cl.
CPC ........... *B65G 47/847* (2013.01); *B65G 47/90* (2013.01); *B65G 2201/0244* (2013.01)

(58) Field of Classification Search
CPC .................. B65G 47/847; B65G 47/90; B65G 2201/0244; B65G 47/907; B65G 47/904; B08B 9/426
See application file for complete search history.

(56) References Cited

U.S. PATENT DOCUMENTS

| | | | |
|---|---|---|---|
| 10,766,146 B2 | 9/2020 | Landler | |
| 11,772,949 B2 | 10/2023 | Landler et al. | |
| 2016/0347556 A1* | 12/2016 | Fahldieck | B65G 47/847 |
| 2019/0322466 A1* | 10/2019 | Schulnig | B65G 47/90 |
| 2020/0039762 A1* | 2/2020 | Schulnig | B67C 7/0053 |
| 2020/0071088 A1* | 3/2020 | Schulnig | B65G 47/847 |
| 2020/0191193 A1* | 6/2020 | Schulnig | F16C 11/04 |
| 2021/0094765 A1 | 4/2021 | Bektasevic et al. | |

FOREIGN PATENT DOCUMENTS

| | | | | |
|---|---|---|---|---|
| CN | 101151105 A | 3/2008 | | |
| CN | 109895126 A | 6/2019 | | |
| CN | 110562901 A | 12/2019 | | |
| CN | 111977597 A | 11/2020 | | |
| DE | 19740892 A1 | 3/1999 | | |
| DE | 20305988 U1 * | 7/2003 | ........... | B65G 47/847 |
| DE | 102005014838 A1 | 10/2006 | | |
| DE | 102018104112 A1 * | 8/2019 | ........... | B65G 47/847 |

(Continued)

OTHER PUBLICATIONS

English abstract of DE102005014838A1.
English abstract of DE19740892A1.
English abstract of DE20305988U1.

*Primary Examiner* — Gene O Crawford
*Assistant Examiner* — Abby A Jorgensen
(74) *Attorney, Agent, or Firm* — Caesar Rivise, PC (57) ABSTRACT

The invention relates, inter alia, to a clamp device for holding a container for a container processing plant. The clamp device has a first clamp arm pair and a second clamp arm pair, which are arranged one above the other for the simultaneous holding of the container and which can be pivoted independently of one another, preferably coaxially. The clamp device enables the container to be held on different external shapes and/or external dimensions of the container.

20 Claims, 4 Drawing Sheets

(56) References Cited

FOREIGN PATENT DOCUMENTS

| EP | 2774876 A1 | * | 9/2014 | ........... B65G 47/847 |
|----|------------|---|--------|-------------------------|
| EP | 3165482 A1 | * | 5/2017 | ........... B65G 47/847 |
| EP | 3613683 A1 | * | 2/2020 | ........... B65G 47/842 |
| WO | WO2016071198 A1 | | 5/2016 | |
| WO | WO-2018162145 A1 | * | 9/2018 | ........... B65G 47/847 |
| WO | WO2018197075 A1 | | 11/2018 | |

* cited by examiner

CLAMP DEVICE AND METHOD FOR TRANSPORTING A CONTAINER

CROSS-REFERENCE TO RELATED APPLICATIONS

This application claims the benefit under 35 U.S.C. § 119(a) of German Patent Application No. DE 10 2021 107 294.8 filed on Mar. 24, 2021 entitled CLAMP DEVICE AND METHOD FOR TRANSPORTING A CONTAINER, and whose entire disclosure is incorporated by reference herein.

TECHNICAL FIELD

The invention relates to a clamp device for holding a container and to a method for transporting a container.

TECHNICAL BACKGROUND

In container processing plants for the production, cleaning, filling, closing, etc., of containers, containers can be held and transported through the system by means of gripper or clamp devices.

For example, DE 10 2005 014 838 A1 discloses a clamp for holding vessels in vessel transport machines, having two clamp arms, which are movable relative to one another for opening and closing. Each clamp arm has a gripping arm and at least one clamp arm has a counter arm. In order to simplify the design, while it is still possible for the vessels to be centred exactly and for excess pressure forces to be absorbed, the clamp arm with the gripping arm and counter arm are formed in one piece in such a way that the gripping arm is of dimensionally stable design and the counter arm is of dimensionally elastic design.

With conventional solutions, it is not possible to grasp different diameters of containers (e.g., bottles). Drawn-in, bulging, conical, etc., containers can be held in the non-cylindrical region only with great effort or not at all by multi-fittings. Contoured bottles are consequently gripped very far down or mis-grips of which the operator is aware are accepted, and this has a major impact on product quality and process reliability.

The underlying object of the invention is to provide an improved system for holding containers. Preferably, it should also be possible with the system to hold containers whose lateral surface has sections of different shapes and/or different sizes in a reliable process and without damage.

SUMMARY OF THE INVENTION

Exemplary benefits may be achieved by approaches specified via the features of independent Claim 1. Advantageous developments are specified in the dependent claims and the description.

One aspect relates to a clamp device (e.g., double clamp device, double-deck clamp device, multiple clamp device) for holding a container for a container processing plant (e.g., for producing, cleaning, testing, filling, sealing, labelling, printing and/or packaging containers for liquid media, preferably beverages or liquid foodstuffs). The clamp device has a first (e.g., lower or upper) clamp arm pair and a second (e.g., upper or lower) clamp arm pair, which are arranged (e.g. directly) one above the other for the simultaneous holding of the container, and which can be pivoted independently of one another (e.g. in a decoupled manner) (e.g. between an open position and a closed position), preferably coaxially (and/or about a preferably common pivot axis).

The two clamp arm pairs advantageously have an additional degree of freedom compared to conventional solutions owing to their independent pivotability. The clamp device advantageously makes it possible to hold a container on different external shapes and/or external dimensions of the container. A number of mis-grips can also be reduced in the case where the shape of the container is complex. As a result, higher product quality and greater process reliability can ultimately be ensured. Increased flexibility can be achieved overall in respect of different shapes and sizes of containers which can be held by the clamp device and thus processed in the container processing plant. Moreover, the solution allows the handling of containers with "normal" container shapes (for example with a cylindrical container body). This makes it possible, for example, to perform a rapid format change between cylindrical containers and contoured containers without the need to change the clamp devices on the transport device. Particularly preferred exemplary embodiments, by means of which the advantages mentioned can advantageously be achieved in a particularly effective manner, are described below.

For example, the containers can be embodied as bottles, cans, canisters, cartons, vials, etc. For example, the containers can have a shape (e.g., shape of lateral surface or outer circumference) that is drawn in, bulging, conical, tapering in some section or sections, widening in some section or sections or generally contoured.

The container can preferably have a first outer circumferential section and a second outer circumferential section which are offset from one another with respect to a vertical axis of the container and which differ from one another in size (e.g., cross-sectional size or diameter) and/or shape. For example, the container can be held or is held by the first clamp arm pair on the first outer circumferential section, and the container can be held or is held by the second clamp arm pair on the second outer circumferential section.

The first clamp arm pair can preferably extend in a first horizontal plane, and the second clamp arm pair can extend in a second horizontal plane, which is spaced from the first horizontal plane.

In one exemplary embodiment, the first clamp arm pair has two first clamp arms, preferably coupled to one another (e.g., by means of a first actuating device), for application to the container, which can be pivoted in opposite directions to one another (for example about a pivot pin of the clamp device). As an alternative or in addition, the second clamp arm pair has two second clamp arms, preferably coupled to one another (e.g., by means of a second actuating device), for application to the container, which can be pivoted in opposite directions to one another and independently of the two first clamp arms (for example about a further pivot pin of the clamp device), preferably coaxially with the two first clamp arms.

It is possible for the two first clamp arms to be formed separately from one another or to be formed integrally/in one piece with one another. As an alternative or in addition, the two second clamp arms can be formed separately from one another or can be formed integrally/in one piece with one another.

In one exemplary embodiment, the first clamp arm pair and the second clamp arm pair can be pivoted independently of one another in such a way that, when being held simultaneously by the first clamp arm pair and the second clamp arm pair, the container can be held on outer circumferential sections of the container which are of different sizes and/or different shapes.

In a further exemplary embodiment, the first clamp arm pair and the second clamp arm pair can be pivoted independently of one another in such a way that a pivoting in (or closing) of the first clamp arm pair, preferably brought about by preloading, is continued until said pair is resting against the container, even if a pivoting in of the second clamp arm pair, preferably brought about by preloading, is already ending owing to said pair resting against the container.

In a further exemplary embodiment, the first clamp arm pair and the second clamp arm pair can be pivoted independently of one another in such a way that a pivoting open (or opening) of the first clamp arm pair, preferably brought about by means of actuation, takes place in a manner decoupled from a pivoting open of the second clamp arm pair, preferably brought about by means of actuation.

In one embodiment, the first clamp arm pair and the second clamp arm pair are of identical construction and/or are of substantially mirror-symmetrical design with respect to a horizontal plane. It is thus advantageously possible to reduce production costs for the clamp device and/or to facilitate assembly of the clamp device, for example.

In a further embodiment, the clamp device further has a preferably substantially block-shaped and/or elongate clamp carrier, which carries the first clamp arm pair and the second clamp arm pair in a pivotable manner (e.g., on at least one pivot pin of the clamp carrier), preferably in mutually opposite end regions of the clamp carrier (e.g. upper end region and lower end region of the clamp carrier with respect to a vertical axis of the clamp device). It is thus advantageously possible to create a compact and stable clamp device which can be mounted in its entirety in a simple manner on a transport device, e.g., by means of the clamp carrier alone.

In a further embodiment, the clamp device further has a first actuating device, which is operatively connected to the first clamp arm pair in order to bring about the pivoting (for example for opening) of the first clamp arm pair. As an alternative or in addition, the clamp device further has a second actuating device, which is operatively connected to the second clamp arm pair, preferably in a manner decoupled from the first actuating device, in order to bring about the pivoting (for example for opening) of the second clamp arm pair. It is advantageously possible, by means of the actuating devices, to bring about an opening or pivoting open of the clamp arm pairs, for example, which, in comparison with the clamp arm pairs or actuating devices, can also begin with a time delay, for example.

In a further embodiment, the first actuating device and the second actuating device are arranged (e.g., directly) one above the other and/or are of identical construction and/or are of substantially mirror-symmetrical design with respect to a horizontal plane and/or are carried by a clamp carrier of the clamp device and/or are embodied as roller controls and/or are arranged between the first clamp arm pair and the second clamp arm pair. It is thus advantageously possible to reduce production costs for the actuating devices and simplify assembly of the clamp device. Furthermore, a compact design and/or reliable control of the actuating devices can advantageously be achieved.

In a further embodiment, at least one of the first actuating device and the second actuating device has two pivot arms. The two pivot arms are preferably arranged in a V shape (or in a scissor-like manner) and/or can be moved back and forth in response to a mechanical input at the respective actuating device and/or are each mounted pivotably on one clamp arm of the respective clamp arm pair which is in operative connection (e.g., in each case in a central section of the clamp arms with respect to a longitudinal axis of the clamp arms).

In a variant embodiment, the two pivot arms are pivotably mounted, preferably coaxially, on a translatable transmission element. The transmission element can preferably be mounted for translation in a clamp carrier of the clamp device (e.g. in a sliding bearing bush and/or a through hole (e.g. between a front side and a rear side of the clamp carrier)) and/or be rod-shaped and/or carry an input element, preferably a rotatable roller or a sliding shoe (e.g. at the end and/or on a rear side/a side of the clamp device or of the clamp carrier which faces away from the container).

In a further variant embodiment, the clamp device further has a first preloading element, preferably a helical spring, which preloads the first clamp arm pair, preferably for closing. As an alternative or in addition, the clamp device further has a second preloading element, preferably a helical spring, which preloads the second clamp arm pair, preferably for closing. The first preloading element and the second preloading element can preferably be arranged one above the other and/or extend parallel. It is thus advantageously possible to bring about closure of the clamp arm pairs without the need for separate actuation for this purpose. Moreover, a holding force or clamping force for holding the container can be generated.

For example, the first and/or second preloading element can be embodied as an elastic element, e.g., a spring (e.g., helical spring or U-spring) or a piece of rubber, or as a magnet.

In a further variant embodiment, at least one of the first preloading element and the second preloading element is supported on a clamp carrier of the clamp device (e.g., on a rear side of the clamp carrier) and/or on an actuating device of the clamp device (e.g., on a transmission element of the actuating device). As an alternative or in addition, at least one of the first preloading element and the second preloading element surrounds a section (e.g., the transmission element) of an actuating device of the clamp device (e.g., coaxially) and/or is arranged on a side of a clamp carrier of the clamp device which faces away from the container.

A further aspect relates to a (e.g., linear or carousel) transport device, preferably a rotatable clamp star, for containers for a container processing plant. The transport device has at least one clamp device as disclosed herein.

It is possible for a plurality of clamp devices as disclosed herein to be included, these being arranged in a manner distributed around a circumference of the transport device or along the transport device, for example.

The transport device can be integrated in a container processing device, for example (e.g., for producing, cleaning, testing, filling, sealing, labelling, printing and/or packaging containers for liquid media, preferably beverages or liquid foodstuffs) or can be designed and/or arranged as a pure transport device, e.g., for transporting containers from/to a container processing device.

In one exemplary embodiment, the transport device has a common guide contour, which is designed to pivot the first clamp arm pair and the second clamp arm pair in operative connection with the first clamp arm pair and the second clamp arm pair, preferably for opening the first clamp arm pair and the second clamp arm pair. Actuation of the first and second clamp arm pairs can thus preferably be performed in a simple manner by means of a single guide contour.

A further aspect relates to a method for transporting a container, preferably by means of a clamp device as disclosed herein or by means of a transport device as disclosed herein. The container has a first outer circumferential section and a second outer circumferential section which are offset from one another with respect to a vertical axis of the container and which differ from one another in size (e.g., cross-sectional size or diameter) and/or shape. The method comprises mutually independent (e.g. decoupled) pivoting (e.g. closing or inward pivoting), preferably brought about by means of preloading, of a first clamp arm pair and of a second clamp arm pair (e.g. about a preferably common pivot axis), which are arranged one above the other, until the first clamp arm pair comes to bear against the first outer circumferential section and the second clamp arm pair comes to bear against the second outer circumferential section (e.g. in each case on both sides) (e.g. one after the other), with the result that the container is held simultaneously by the first clamp arm pair and the second clamp arm pair. The method can preferably be used to achieve the same advantages which have already been described herein for the clamp device.

For example, the method can further comprise moving the first and second clamp arm pairs with the held container in order to move the container, e.g., on a circular path (e.g., by means of a carousel such as a clamp star) and/or along a straight line (e.g., with linear conveyor).

In one exemplary embodiment, the method further comprises mutually independent (e.g., decoupled) pivoting of the first clamp arm pair and of the second clamp arm pair (e.g., about a preferably common pivot axis) away from the container to release the container, preferably brought about by independent actuation of the first clamp arm pair and the second clamp arm pair, particularly preferably by means of the same guide contour (e.g. control cam or guide cam).

The above-described preferred embodiments and features of the invention can be combined with one another in any desired manner.

BRIEF DESCRIPTION OF THE FIGURES

Further details and advantages of the invention will be described below with reference to the attached drawings. In the drawings.

The embodiments shown in the figures at least partially coincide, and therefore similar or identical parts are provided with the same reference signs and, for their explanation, reference is also made to the description of the other embodiments or figures to avoid repetition.

DETAILED DESCRIPTION OF ILLUSTRATIVE EMBODIMENTS

Figure 1:
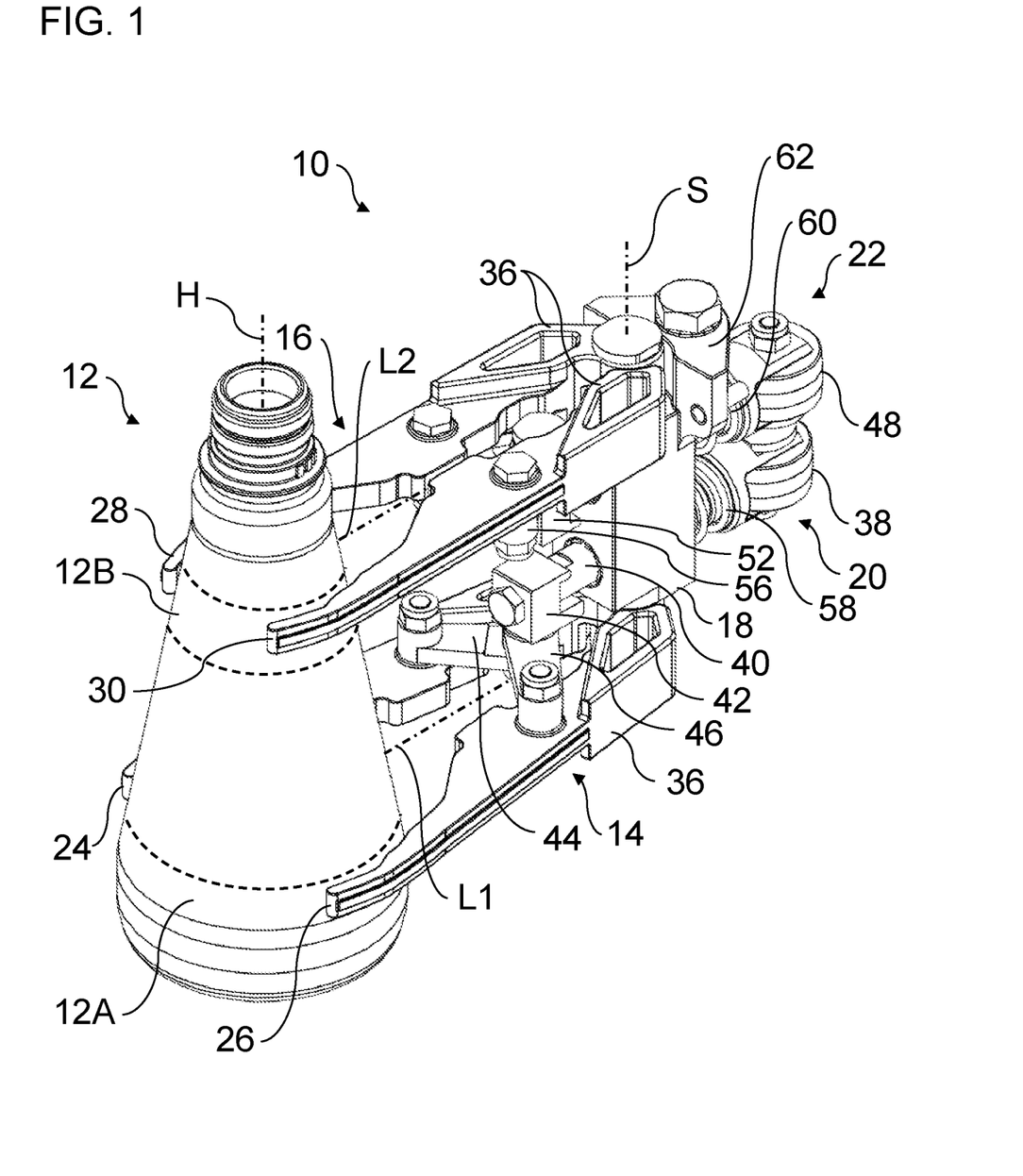
FIG. 1 shows a perspective view of a clamp device with a container held therein according to one exemplary embodiment of the present disclosure.
Figure 2:
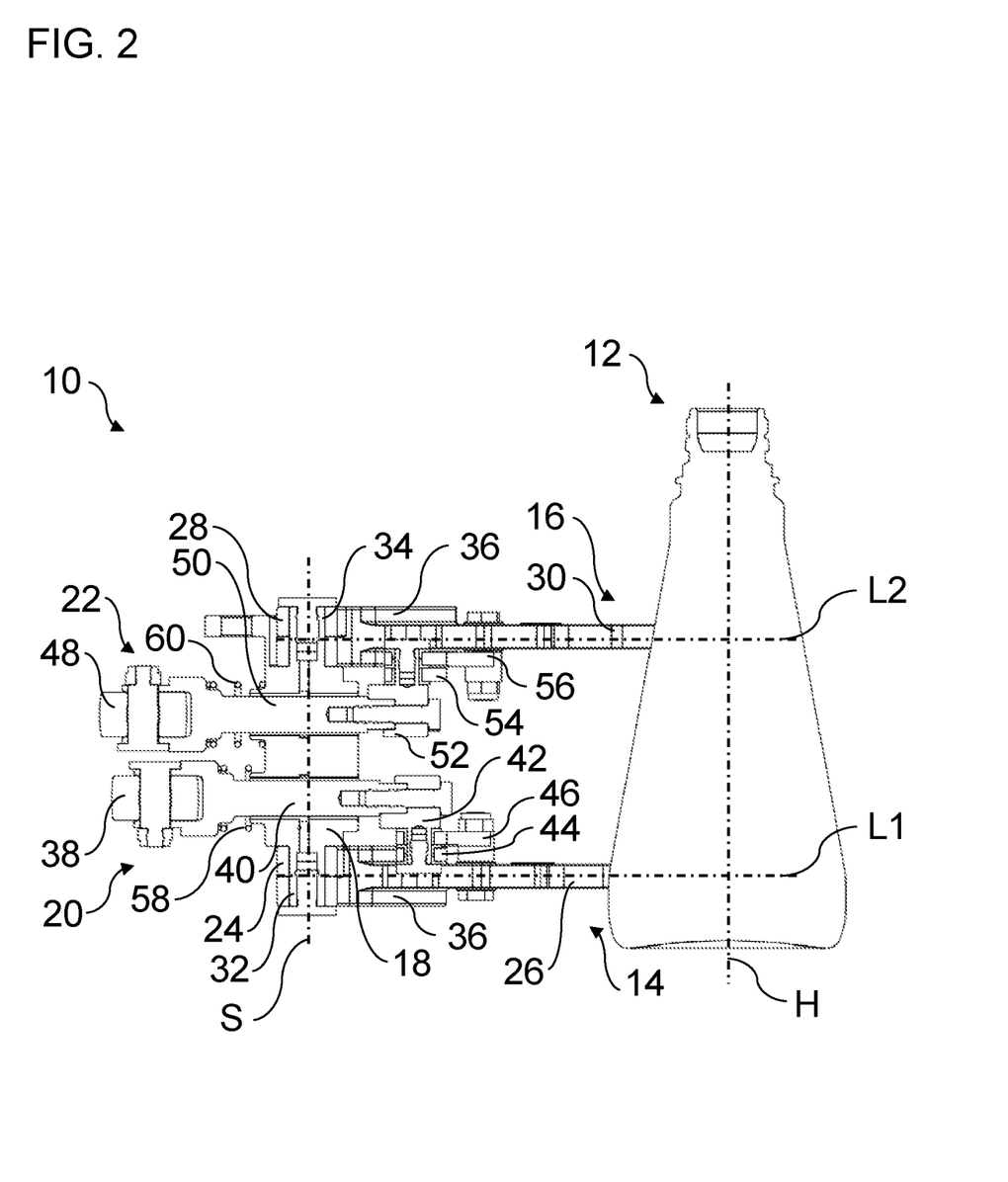
FIG. 2 shows a sectional view through the illustrative clamp device.

FIGS. 1 and 2 show a clamp device 10 in different views. The clamp device 10 is holding a container 12. The container 12 preferably has a container body with different outer circumferences along its length or height. The container 12 can preferably be embodied as a "contoured container". The container 12 can nevertheless be held securely by the clamp device 10, as described by way of example below.

The clamp device 10 has a first clamp arm pair 14 and a second clamp arm pair 16. The clamp device 10 can optionally have a clamp carrier 18, a first actuating device 20 and/or a second actuating device 22.

The clamp device 10 is preferably designed as a double clamp device with the two clamp arm pairs 14, 16. However, it is also possible for the clamp device to have further clamp arm pairs (not illustrated). In general, the clamp device 10 can be embodied as a multiple clamp device with several clamp arm pairs 14, 16.

The first clamp arm pair 14 can have two first clamp arms 24, 26. The second clamp arm pair 16 can have two second clamp arms 28, 30. The clamp arms 24 and 26 (or 28 and 30) can be formed separately, as illustrated in FIGS. 1 and 2. It is possible for the clamp arms 24 and 26 (or 28 and 30) to be formed integrally/in one piece with one another.

The second clamp arm pair 16 can preferably be of substantially identical construction to the first clamp arm pair and/or of functionally identical design to the first clamp arm pair 14. The first clamp arm pair 14 and the second clamp arm pair 16 are preferably designed to be substantially mirror-symmetrical with respect to a central longitudinal plane of the clamp device 10 or with respect to a horizontal plane (in the assembled state). The central longitudinal plane divides the clamp device 10 at half its height and extends parallel to longitudinal axes L1, L2 of the clamp arm pairs 14, 16.

The clamp arm pairs 14, 16 are each pivotably mounted. The pivotable mounting is preferably arranged at an end of the clamp arm pairs 14, 16 opposite the container 12 or at the free ends of the clamp arm pairs 14, 16. The clamp arm pairs 14, 16 can preferably be pivotable coaxially with one another or about a common pivot axis S.

More specifically, the first clamp arms 24, 26 can preferably be pivotable in opposite directions to one another. The second clamp arms 28, 30 can be pivotable in opposite directions to one another. To hold the container 12, the first clamp arms 24, 26 can be pivoted relative to one another until they come to rest against the container 12, and the second clamp arms 28, 30 can be pivoted relative to one another until they come to rest against the container 12. To release the container 12, the first clamp arms 24, 26 can be pivoted away from one another, and the second clamp arms 28, 30 can be pivoted away from one another.

The first and second clamp arm pairs 14, 16 are arranged for the simultaneous holding of the same container 12. The first and second clamp arm pairs 14, 16 are arranged vertically offset from one another, e.g., with respect to a vertical axis H of the container 12. For example, the second clamp arm pair 16 (the two second clamp arms 28, 30) is arranged above the first clamp arm pair 14 (the two first clamp arms 24, 26), as illustrated in FIGS. 1 and 2, or vice versa.

The first clamp arm pair 14 can hold the container 12 on a first outer circumferential section or lateral surface section 12A. The second clamp arm pair 16 can hold the container 12 on a second outer circumferential section or lateral surface section 12B. The outer circumferential sections 12A, 12B are each preferably fully encircling or continuous. The outer circumferential sections 12A and 12B are arranged offset from one another with respect to the vertical axis H of the container 12. For example, the second outer circumferential section 12B is arranged above the first outer circumferential section 12A, as shown in FIGS. 1 and 2, or vice versa.

The outer circumferential sections 12A and 12B may differ from one another in terms of shape and/or size or length. In the exemplary embodiment illustrated, for example, the shape of the outer circumferential sections 12A and 12B is in each case the same, namely circular with respect to a cross section or frustoconical with respect to the vertical axis H. The size of the outer circumferential sections 12A and 12B differs. The second outer circumferential section 12B has a smaller circumference and a smaller diameter than the first outer circumferential section 12A.

The container 12 can be held in each case on the front sections of the clamp arm pairs 14, 16, the sections adjacent to the container 12. More specifically, the container 12 can be held between the free ends of the first clamp arms 24, 26 and between the free ends of the second clamp arms 28, 30. The first clamp arms 24, 26 and the second clamp arms 28, 30 can engage around the container 12 at their free ends. The first clamp arms 24, 26 and the second clamp arms 28, 30 can clamp the container 12 between their free ends by applying a holding force. The holding force can be produced, for example, by a preload acting on the first clamp arm pair 14 and a preload acting on the second clamp arm pair 16.

The two clamp arm pairs 14, 16 can be pivoted independently of or in a manner decoupled from one another. The first clamp arm pair 14 can be pivoted without the second clamp arm pair 16 also pivoting, and vice versa. A contact pivoting movement of the first clamp arm pair 14 against the second outer circumferential section 12B does not influence a contact pivoting movement of the first clamp arm pair 14 against the first outer circumferential section 12A, and vice versa. The contact pivoting movement of the second clamp arm pair 16 can, for example, continue while the first clamp arm pair 14 is already resting against the first outer circumferential section 12A and vice versa (e.g., depending on a shape and/or size of the outer circumferential sections 12A, 12B). It is possible, for example, for the clamp arm pairs 14, 16, preferably under the action of a preload on the clamp arm pairs 14 and 16, to start the contact pivoting movements at the same time (e.g., when an actuation of the clamp arm pairs 14, 16 is ended) and/or to end them successively (e.g. in each case at the time of contact with the container 12). During the contact pivoting movement, the first clamp arms 24, 26 pivot towards one another. During the contact pivoting movement, the second clamp arms 28, 30 pivot towards one another.

A release pivoting movement of the second clamp arm pair 16 away from the second outer circumferential section 12B does not influence a release pivoting movement of the first clamp arm pair 14 away from the first outer circumferential section 12A, and vice versa. The release pivoting movement of the first clamp arm pair 14 can begin, for example, before the release pivoting movement of the second clamp arm pair 16 begins, and vice versa (e.g., depending on a shape and/or size of the outer circumferential sections 12A, 12B). For example, the clamp arm pairs 14, 16 can end the release pivoting movements simultaneously, preferably under the action of an actuation of the clamp arm pairs 14 and 16. During the release pivoting movement of the first clamp arm pair 14, the first clamp arms 24, 26 pivot away from one another. During the release pivoting movement of the second clamp arm pair 16, the second clamp arms 28, 30 pivot away from one another.

The clamp arm pairs 14, 16 can in each case extend along a longitudinal axis L1 and L2, respectively. The longitudinal axes L1, L2 can extend substantially parallel to one another. The longitudinal axes L1, L2 can extend substantially perpendicular to the vertical axis H. The longitudinal axes L1, L2 can extend substantially perpendicular to the pivot axis S. In the assembled state, the longitudinal axes L1, L2 can extend substantially parallel to a horizontal plane.

The clamp arm pairs 14, 16 can be pivotably mounted on the clamp carrier 18. The clamp arm pairs 14, 16 can be pivotably mounted on the clamp carrier 18 on opposite sides of the clamp carrier 18. The clamp carrier 18 can be arranged between the clamp arm pairs 14, 16, preferably with respect to a vertical axis of the clamp device 10. The clamp carrier 18 can carry the clamp arm pairs 14, 16. The clamp carrier 18 is preferably of block-shaped design. The clamp arm carrier preferably extends longitudinally along the pivot axis S and/or parallel to the vertical axis H.

For example, the clamp arm pairs 14, 16 can each be pivotably mounted by means of a preferably elongate pivot pin 32, 34 of the clamp carrier 18. Specifically, the clamp arms 24, 26, 28, 30 may each have a through hole, e.g., at an end of the respective clamp arm 24, 26, 28, 30 which is opposite the respective free end. The pivot pins 32, 34 may extend through the through holes. It is possible for sliding bushes to be arranged between the pivot pins 32, 34 and the through holes.

The pivot pins 32, 34 may extend coaxially with the pivot axis S. The pivot pins 32, 34 may extend parallel to the vertical axis H. The pivot pins 32, 34 can be arranged on opposite sides of the clamp carrier 18. For example, pivot pin 34 can be arranged on an upper side of the clamp carrier 18. Pivot pin 32 can be arranged on an underside of the clamp carrier 18.

The first clamp arms 24, 26 can be placed one above the other on pivot pin 32. The second clamp arms 28, 30 can be placed one above the other on pivot pin 34. The first clamp arms 24, 26 can be secured axially on pivot pin 32. The second clamp arms 28, 30 can be secured axially on pivot pin 34. The respective axial securing can be effected, for example, by means of a screw head of a screw, which is screwed into a (e.g., central) hole in the pivot pin 32, 34, preferably coaxially with the pivot axis S.

The clamp arm pairs 14, 16 can be reinforced adjacent to the pivotable mounting on the clamp carrier 18. More specifically, a material thickness of the clamp arms 24, 26, 28, 30 adjacent to the pivotable mounting can be increased. The clamp arms 24, 26, 28, 30 can have reinforcement ribs 36 adjacent to the pivotable mounting, for example. The reinforcing ribs 36 can be embodied as wall elements on an upper side and/or an underside of the clamp arms 24, 26, 28, 30, for example. The wall elements can be annular or encircling structures. The reinforcing ribs 36 can be arranged in the section of the clamp arms 24, 26, 28, 30 which are opposite the free ends of the clamp arms 24, 26, 28, 30. The reinforcing ribs 36 can taper in the direction of the free ends of the clamp arms 24, 26, 28, 30.

It is possible for the clamp arms 24 and 26 as well as 28 and 30 to have, in their central sections, stops which face one another in relation to the longitudinal axes L1 and L2. At the stops, the clamp arms 24 and 26 as well as 28 and 30 can rest against one another in the closed position when they are not holding a container 12.

The clamp arm pairs 14, 16 can be pivoted about the pivot pins 32, 34 or the pivot axis S by the actuating devices 20, 22. The actuating devices 20, 22 can preferably each be embodied as roller controls. The actuating devices 20, 22 can preferably pivot the clamp arm pairs 14, 16 for opening to release the container 12.

The actuating devices 20, 22 are preferably of identical construction and/or of functionally identical design. The first actuating device 20 and the second actuating device 22 are preferably designed to be substantially mirror-symmetrical with respect to the central longitudinal plane of the clamp device 10 or with respect to a horizontal plane (in the assembled state).

The actuating devices 20, 22 can be arranged one above the other. The actuating devices 20, 22 can be arranged between the first clamp arm pair 14 and the second clamp arm pair 16, preferably with respect to a vertical axis of the clamp device 10. More specifically, the first actuating device 20 can be arranged partially on an upper side of the first clamp arm pair 14. The second actuating device 22 can be arranged partially on an underside of the second clamp arm pair 16. The actuating devices 20, 22 can extend substantially parallel to the longitudinal axes L1, L2 of the clamp arm pairs 14, 16.

The actuating devices 20, 22 can be carried by the clamp carrier 18. The actuating devices 20, 22 can extend through the clamp carrier 18, preferably from a rear side or a side of the clamp carrier 18 which faces away from the container 12 to a front side or a side of the clamp carrier 18 which faces the container 12.

The actuating devices 20, 22 are themselves decoupled from one another, enabling them to move independently of one another. The first actuating device 20 can move without the second actuating device 22 moving, and vice versa.

The first actuating device 20 can be connected to the first clamp arms 24, 26 in a section between the free ends and the pivot bearing of the first clamp arms 24, 26, preferably in central sections of the first clamp arms 24, 26 with respect to the longitudinal axis L1. The second actuating device 22 can be connected to the second clamp arms 28, 30 in a section between the free ends and the pivot bearing of the second clamp arms 28, 30, preferably in central sections of the second clamp arms 28, 30 with respect to the longitudinal axis L2.

The first actuating device 20 can preferably have an input element 38, a transmission element 40, a coupling element 42 and two pivot arms 44, 46. It is possible for the components 38, 40, 42, 44, 46 to be at least partially integrated into one another. The second actuating device 22 can be constructed and function like the first actuating device 20, with an input element 48, a transmission element 50, a coupling element 52 and two pivot arms 54, 56. The following detailed explanations regarding the first actuating device 20 can therefore apply in corresponding fashion, mutatis mutandis, to the second actuating device 22.

The input element 38 is carried on the transmission element 40, preferably at the end. The input element 38 can be arranged on a side of the clamp carrier 18 which faces away from the container 12 or on a rear side of the clamp device 10 or of the clamp carrier 18. The input element 38 can receive a mechanical input. The input element can be embodied as a rotatable roller, as illustrated in FIGS. 1 and 2, or as a sliding shoe, for example. The input element 38 can be acted upon by a guide cam or control cam, for example. The input element 38 can transmit the received input to the transmission element 40.

The transmission element 40 is mounted for translation in the clamp carrier 18, preferably in a sliding bush. The transmission element 40 can be elongate, preferably rod-shaped. The transmission element 40 can be moved in response to the input, preferably parallel to the longitudinal axes L1, L2 and/or perpendicularly to the pivot axis S. The transmission element 40 carries the coupling element 42, preferably at an end opposite the input element 38.

The coupling element 42 is mounted on the transmission element 40, preferably at the end. The coupling element 42 can be attached to the transmission element 40 by means of a screw, for example. If the transmission element 40 is moved, the coupling element 42 is also moved with it. The coupling element 42 couples the transmission element 40 to the pivot arms 44, 46.

Pivot arm 44 connects the first clamp arm 24 to the coupling element 42. Pivot arm 44 is pivotably connected at one end to the coupling element 42, e.g., by means of a bolt or pivot pin. At an opposite end, pivot arm 44 is pivotably connected to the clamp arm 24, e.g., by means of a bolt or pivot pin.

Pivot arm 46 connects the first clamp arm 26 to the coupling element 42. Pivot arm 46 is pivotably connected at one end to the coupling element 42, e.g., by means of a bolt or pivot pin. At an opposite end, pivot arm 46 is pivotably connected to the first clamp arm 26, e.g., by means of a bolt or pivot pin.

The pivot arms 44, 46 are preferably arranged in a V shape and/or one above the other (e.g., with respect to the vertical axis). The pivot arms 44, 46 are preferably pivotable coaxially with respect to the coupling element 42. However, parallel pivot axes for the pivot arms 44, 46 in relation to the coupling element 42 are also possible, for example. The pivot arms 44, 46 are preferably arranged between the coupling element 42 or the transmission element 40 and the first clamp arm pair 14 in relation to a vertical axis of the clamp device 10.

In response to a mechanical input, a movement of the input element 48 in the direction of the container 12 causes a movement of the transmission element 40 in the direction of the container 12. A movement of the transmission element 40 in the direction of the container 12 causes a movement of the coupling element 42 in the direction of the container 12. A movement of the coupling element 42 in the direction of the container 12 causes a movement of those ends of the pivot arms 44, 46 which are pivotably connected to the coupling element 42 in the direction of the container 12. A movement of those ends of the pivot arms 44, 46 which are pivotably connected to the coupling element 42 causes pivoting of the pivot arms 44, 46 at these ends since the pivot arms 44, 46 are supported on the first clamp arms 24, 26. The pivoting of the pivot arms 44, 46 causes pivoting of the first clamp arms 24, 26, preferably pivoting open or opening of the first clamp arms 24, 26 to release the container 12.

The clamp arm pairs 14, 16 can be subjected to a preload towards closing or pivoting in. For example, the clamp device 10 can have a first preloading element 58 for the first clamp arm pair 14 and a second preloading element 60 for the second clamp arm pair 16.

The preloading elements 58, 60 can be arranged and formed separately from the clamp arm pairs 14, 16, as illustrated in FIGS. 1 and 2. It is possible for the preloading elements 58, 60 to be arranged directly on the clamp arm pairs 14, 16 and/or to be formed integrally/in one piece with the respective clamp arm pair 14 or 16. The preloading elements can be substantially U-shaped and/or can engage around the respective clamp arm pair 13 or 16 in a horizontal plane, for example.

The preloading elements 58, 60 can be arranged one above the other. The preloading elements 58, 60 can extend parallel to one another and/or parallel to the longitudinal axes L1, L2. The preloading elements 58, 60 can be arranged on a side of the clamp carrier 18 which faces away from the container 12.

The preloading elements 58, 60 can be supported on the clamp carrier 18, preferably on a side of the clamp carrier 18 which faces away from the container 12. Preloading element 58 can be supported on transmission element 40, preferably on an end section of the transmission element 40 which carries input element 38. Preloading element 60 can be supported on transmission element 50, preferably on an end section of the transmission element 50 which carries input element 48.

Transmission element 40 can extend through preloading element 58, or preloading element 58 can surround a section of transmission element 40. Transmission element 50 can extend through preloading element 60, or preloading element 60 can surround a section of transmission element 50. The preloading elements 58, 60 are embodied as helical springs, for example.

The preloading elements 58, 60 can preload the actuating devices 20, 22 in a direction away from the container 12 to close the clamp arm pairs 14, 16, for example. More specifically, the preloading elements 58 and 60 can preload the transmission elements 40 and 50 in a direction away from the container 12. As a result of the coupling with the pivot arms 44, 46 and 54, 56, the clamp arms 24, 26 and 28, 30 are pivoted towards one another or pivoted in. By means of the preloading, a holding force can be applied to the container 12, enabling the container 12 to be held in a force-locking manner between the clamp arms 24, 26 and 28, 30. By means of the mechanical input at the input elements 38 and 48, the preloading caused by the preloading elements 58, 60 for opening the clamp arm pairs 14 and 16 can be overcome.

The clamp device 10 can have a fastening device 62. The fastening device 62 is designed to fasten the clamp device 10 to a transport device, e.g., a transport carousel, e.g., by means of a screw connection. The fastening device 62 can have at least one positioning element. The positioning element can correctly position the clamp device 10 on the transport device as it is fastened to the transport device. The positioning element can be embodied as a positioning pin, for example. The fastening device 62 can be fastened to the clamp carrier 18, e.g., on a rear side, upper side and/or underside of the clamp carrier 18.

Figure 3:
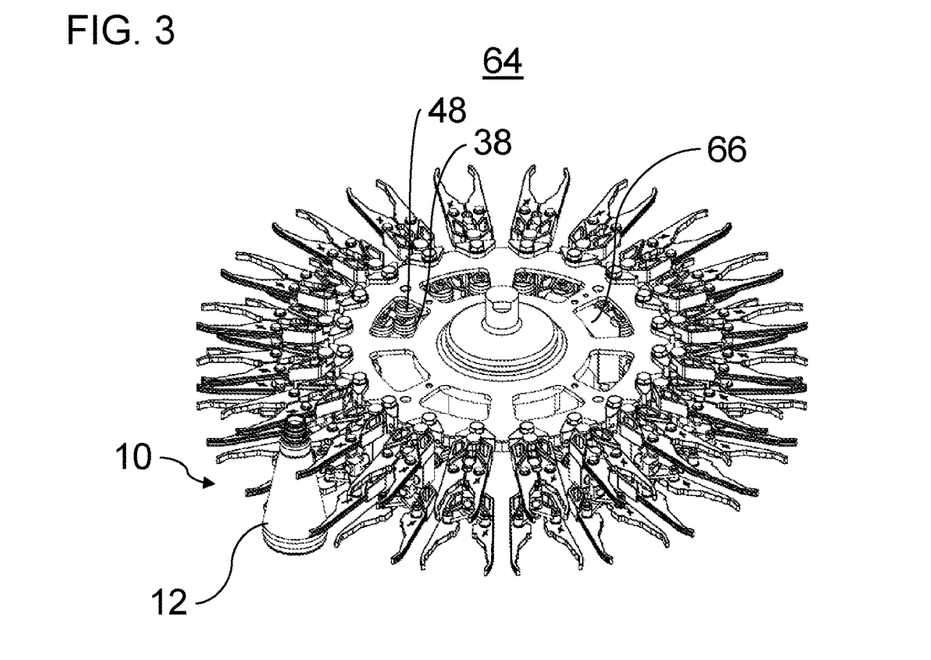
FIG. 3 shows a perspective view of a transport device according to one exemplary embodiment of the present disclosure.
Figure 4:
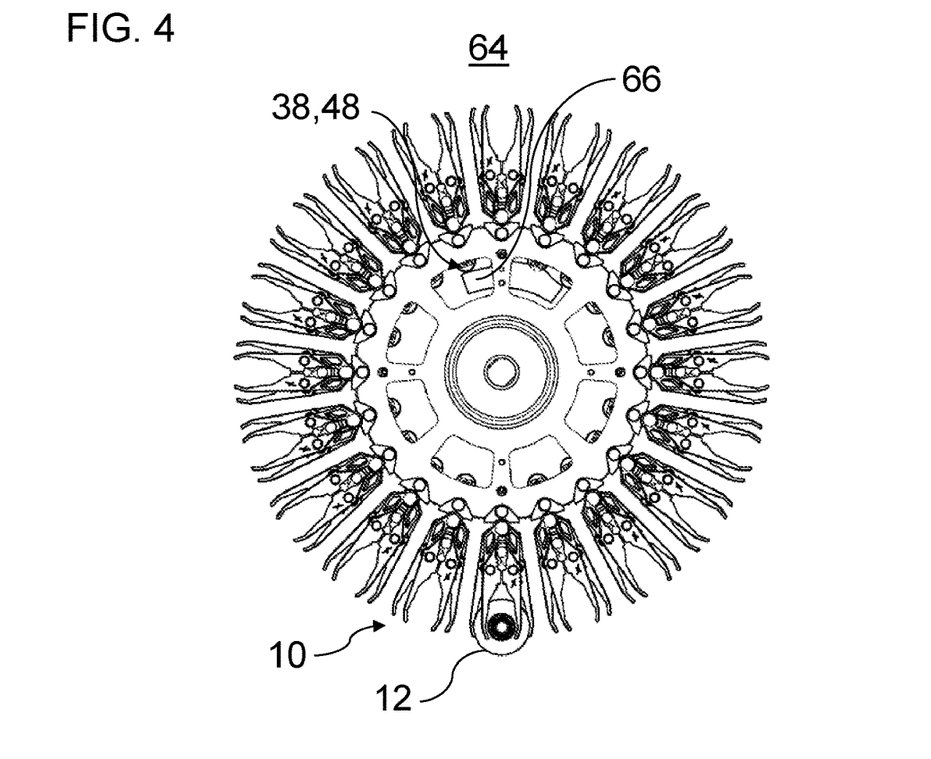
FIG. 4 shows a plan view of the illustrative transport device.
Figure 5:
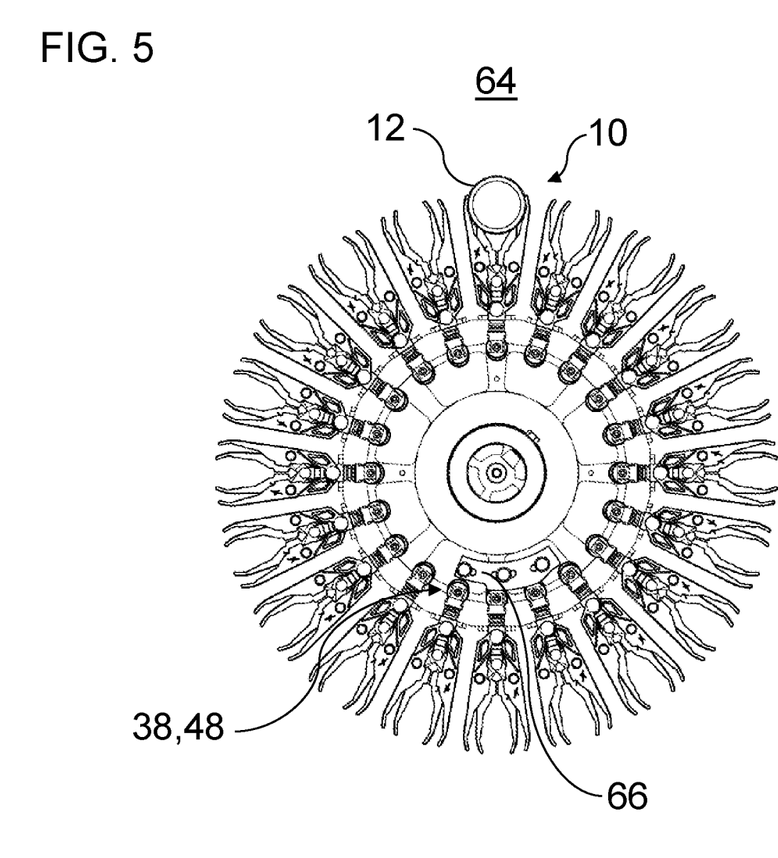
FIG. 5 shows a view from below of the illustrative transport device.

FIGS. 3 to 5 show different views of a transport device 64 with several clamp devices 10. For the sake of clarity, just one container 12 is illustrated. Nevertheless, the clamp devices 10 are all illustrated as if they are each carrying a container 12.

The transport device 64 is embodied as a rotatable transport carousel. The clamp devices 10 are arranged, preferably uniformly, around a circumference of the transport device 64. The transport device 64 can be embodied as a "clamp star". Owing to the two-tier nature of the clamp devices 10, the clamp star is designed as a two-tier clamp star.

The transport device 64 has a guide contour 66. The input elements 38, 48 can follow the common guide contour 66. The temporary operative connection between the guide contour 66 and the clamp arm pairs 14 and 16 by means of the actuating devices 20, 22 brings about opening or pivoting open of the clamp arm pairs 14, 16. The container 12 is released.

In the case of the container 12 illustrated in the exemplary embodiment, which is narrower at the top than at the bottom, the input element 48 would first come into contact with the guide contour 66 since it projects further to the rear in a direction parallel to the longitudinal axes L1, L2 than the input element 38. After the opening of the second clamp arm pair 16 has already begun owing to the operative connection to the guide contour 66 by means of the second actuating device 22, the input element 38 comes into contact with the guide contour 66. The first clamp arm pair 14 begins to open, while the second clamp arm pair 16 is opening further. The contact can preferably take place at a point in time when the clamp arm pairs 14, 16 are open (closed) to the same extent.

The invention is not restricted to the preferred exemplary embodiments described above. On the contrary, a multiplicity of variants and modifications is possible which likewise make use of the idea of the invention and therefore fall within the scope of protection. In particular, the invention also claims protection for the subject matter and the features of the dependent claims independently of the claims referred to. In particular, the individual features of independent claim 1 are each disclosed independently of one another. In addition, the features of the dependent claims are also disclosed independently of all the features of independent claim 1 and, for example, independently of the features relating to the presence and/or the configuration of the first clamp arm pair and/or of the second clamp arm pair of independent claim 1.

LIST OF REFERENCE SIGNS 10 clamp device
12 container
12A first outer circumferential section
12B second outer circumferential section
14 first clamp arm pair
16 second clamp arm pair
18 clamp carrier
20 first actuating device
22 second actuating device
24 clamp arm
26 clamp arm
28 clamp arm
30 clamp arm
32 pivot pin
34 pivot pin
36 reinforcing rib
38 input element
40 transmission element
42 coupling element
44 pivot arm
46 pivot arm
48 input element
50 transmission element
52 coupling element
54 pivot arm
56 pivot arm
58 preloading element
60 preloadig element
62 fastening device
64 transport device
66 guide contour (control cam/guide cam)
H vertical axis
S pivot axis
L1 longitudinal axis
L2 longitudinal axis

What is claimed is:

1. A clamp device for holding a container for a clamp star rotatable about a rotation axis, the clamp device comprising:
   a first clamp arm pair and a second clamp arm pair, which
      are arranged one above the other for the simultaneous holding of the container and which are pivotable independently of each other, wherein the first clamp arm pair and the second clamp arm pair are coaxially pivotable independently of each other about a common pivot axis, which runs spaced apart from the rotation axis, the first clamp arm pair and the second clamp arm pair being clamp arm pairs;

at least one pivot pin attached to the clamp arm pairs, the at least one pivot pin extending coaxially along the common pivot axis;

a first actuating device, which is operatively connected to the first clamp arm pair to bring about the pivoting of the first clamp arm pair; and a second actuating device, which is operatively connected to the second clamp arm pair to bring about the pivoting of the second clamp arm pair, wherein the first actuating device and the second actuating device are decoupled from each other.

2. The clamp device according to claim 1, wherein:
the first clamp arm pair has two first clamp arms for application to the container, and are configured to pivot in opposite directions to one another; and
the second clamp arm pair has two second clamp arms for application to the container, and are configured to pivot in opposite directions to one another and independently of the two first clamp arms.

3. The clamp device according to claim 2, wherein the two first clamp arms are coupled to each other, and the two second clamp arms are coupled to each other.

4. The clamp device according to claim 2, wherein the two second clamp arms are configured to pivot coaxially with the first two clamp arms.

5. The clamp device according to claim 1, wherein the first clamp arm pair and the second clamp arm pair are configured to pivot independently of one another in such a way that:
when being held simultaneously by the first clamp arm pair and the second clamp arm pair, the container is configured to be held on outer circumferential sections of the container which have at least one of different sizes and different shapes; and
a pivoting in of the first clamp arm pair brought about by preloading is continued until said pair is resting against the container, regardless of whether a pivoting in of the second clamp arm pair brought about by preloading is already ending owing to said pair resting against the container; and
a pivoting open of the first clamp arm pair brought about via actuation takes place in a manner decoupled from a pivoting open of the second clamp arm pair brought about via the actuation.

6. The clamp device according to claim 1, wherein
the first clamp arm pair and the second clamp arm pair are of identical construction and/or are of substantially mirror-symmetrical design with respect to a horizontal plane.

7. The clamp device according to claim 1, further having:
an elongate clamp carrier, which carries the first clamp arm pair and the second clamp arm pair in a pivotable manner.

8. The clamp device according to claim 7, wherein the first clamp arm pair and the second clamp arm pair are located at mutually opposite ends of the clamp carrier.

9. The clamp device according to claim 1, wherein:
the first actuating device and the second actuating device are arranged one above the other, are of identical construction, are of substantially mirror-symmetrical design with respect to a horizontal plane, are carried by a clamp carrier of the clamp device, are embodied as roller controls and/or are arranged between the first clamp arm pair and the second clamp arm pair.

10. The clamp device according to claim 1, wherein:
at least one of the first actuating device and the second actuating device has two pivot arms, which are arranged in a V shape, can be moved back and forth in response to a mechanical input at the respective actuating device, and/or are each mounted pivotably on one clamp arm of the respective clamp arm pair which is in operative connection.

11. The clamp device according to claim 10, wherein:
the two pivot arms are pivotably mounted coaxially on a translatable transmission element, which is mounted for translation in a clamp carrier of the clamp device, is rod-shaped and configured to carry an input element having one of a rotatable roller and a sliding shoe.

12. The clamp device according to claim 1, further having:
a first preloading element, which preloads the first clamp arm pair for closing; and
a second preloading element, which preloads the second clamp arm pair for closing,
wherein the first preloading element and the second preloading element are arranged one above the other and extend parallel to each other.

13. The claim device according to claim 12, wherein the first preloading element and
the second preloading element include helical springs.

14. The clamp device according to claim 12, wherein:
at least one of the first preloading element and the second preloading element is supported on a clamp carrier of the clamp device, is supported on an actuating device of the clamp device, surrounds a section of an actuating device of the clamp device and is arranged on a side of a clamp carrier of the clamp device which faces away from the container.

15. A transport device for containers, comprising:
a clamp star rotatable about a rotation axis and having a plurality of clamp devices, each one of the plurality of clamp devices including:
a first clamp arm pair and a second clamp arm pair, which are arranged one above the other for the simultaneous holding of a container and which are pivotable independently of each other, wherein the first clamp arm pair and the second clamp arm pair are coaxially pivotable independently of each other about a common pivot axis of the respective clamp device, each clamp device having its own common pivot axis, which runs spaced apart from the rotation axis, the first clamp arm pair and the second clamp arm pair being clamp arm pairs;
at least one pivot pin attached to the clamp arm pairs, the at least one pivot pin extending coaxially along the common pivot axis;
a first actuating device, which is operatively connected to the first clamp arm pair to bring about the pivoting of the first clamp arm pair; and
a second actuating device, which is operatively connected to the second clamp arm pair to bring about the pivoting of the second clamp arm pair, wherein the first actuating device and the second actuating device are decoupled from each other.

16. The transport device according to claim 15, further having:
a common guide contour, which is designed to pivot the first clamp arm pair and the second clamp arm pair in operative connection with the first clamp arm pair and the second clamp arm pair for opening the first clamp arm pair and the second clamp arm pair.

17. A method for transporting containers via a plurality of clamp devices of a clamp star rotatable about a rotation axis, the plurality of clamp devices each including a first clamp arm pair and a second clamp arm pair that are arranged one above the other for the simultaneous holding of the container and which are pivotable independently of each other, wherein the first clamp arm pair and the second clamp arm pair are coaxially pivotable independently of each other about a common pivot axis of the respective clamp device, each clamp device having its own common pivot axis, which runs spaced apart from the rotation axis, the first clamp arm pair and the second clamp arm pair being clamp arm pairs, at least one pivot pin attached to the clamp arm pairs, the at least one pivot pin extending coaxially along the common pivot axis, a first actuating device that is operatively connected to the first clamp arm pair to bring about the pivoting of the first clamp arm pair, and a second actuating device that is operatively connected to the second clamp arm pair to bring about the pivoting of the second clamp arm pair, wherein the first actuating device and the second actuating device are decoupled from each other,
wherein the container has a first outer circumferential section and a second outer circumferential section which are offset from one another with respect to a vertical axis of the container and which differ from one another in size and/or shape,
wherein the method comprises:
mutually independent pivoting of the first clamp arm pair and the second clamp arm pair, which are arranged one above the other, about the common axis of the respective clamp device until the first clamp arm pair comes to bear against the first outer circumferential section and the second clamp arm pair comes to bear against the second outer circumferential section, with the result that the container is held simultaneously by the first clamp arm pair and the second clamp arm pair.

18. The method according to claim 17, further comprising:
mutually independent pivoting of the first clamp arm pair and the second clamp arm pair away from the container to release the container, the pivoting brought about by independent actuation of the first clamp arm pair and the second clamp arm pair via a common guide contour.

19. The clamp device according to claim 1, wherein the first actuating device and the second actuating device are independently operable from each other for bidirectional pivoting of the first clamp arm pair independent of bidirectional pivoting of the second clamp arm pair.

20. A clamp device for holding a container for a container processing plant, comprising:
a first clamp arm pair and a second clamp arm pair, which are arranged one above the other for the simultaneous holding of the container and which are pivotable independently of each other, wherein the first clamp arm pair and the second clamp arm pair are configured to pivot independently of one another in such a way that:
a pivoting in of the first clamp arm pair brought about by preloading is continued until said pair is resting against the container, regardless of whether a pivoting in of the second clamp arm pair brought about by preloading is already ending owing to said pair resting against the container, and
a pivoting open of the first clamp arm pair brought about via actuation takes place in a manner decoupled from a pivoting open of the second clamp arm pair brought about via the actuation;
an actuating device having a transmission element;
a first preloading element, which preloads the first clamp arm pair for closing; and
a second preloading element, which preloads the second clamp arm pair for closing,
wherein the first preloading element and the second preloading element are helical springs, at least one of the first preloading element and the second preloading element is supported on the transmission element of the actuating device of the clamp device, and the transmission element extends through a respective one of the first preloading element and the second preloading element.

* * * * *